US010325269B2

(12) United States Patent
Kwon et al.

(10) Patent No.: US 10,325,269 B2
(45) Date of Patent: Jun. 18, 2019

(54) HOME APPLIANCE DIAGNOSIS SYSTEM AND DIAGNOSIS METHOD FOR SAME

(75) Inventors: Eui Hyeok Kwon, Changwon-si (KR); Hyun Sang Kim, Changwon-si (KR)

(73) Assignee: LG ELECTRONICS INC., Seoul (KR)

(*) Notice: Subject to any disclaimer, the term of this patent is extended or adjusted under 35 U.S.C. 154(b) by 1552 days.

(21) Appl. No.: 13/808,414

(22) PCT Filed: Jul. 6, 2011

(86) PCT No.: PCT/KR2011/004949
§ 371 (c)(1),
(2), (4) Date: Jun. 17, 2013

(87) PCT Pub. No.: WO2012/005513
PCT Pub. Date: Jan. 12, 2012

(65) Prior Publication Data

US 2013/0262322 A1 Oct. 3, 2013

Related U.S. Application Data

(60) Provisional application No. 61/361,696, filed on Jul. 6, 2010, provisional application No. 61/361,667, filed on Jul. 6, 2010.

(51) Int. Cl.
*D06F 33/02* (2006.01)
*D06F 39/00* (2006.01)
(Continued)

(52) U.S. Cl.
CPC .......... *G06Q 30/016* (2013.01); *D06F 33/02* (2013.01); *D06F 39/005* (2013.01); *G06F 17/00* (2013.01);
(Continued)

(58) Field of Classification Search
None
See application file for complete search history.

(56) References Cited

U.S. PATENT DOCUMENTS 3,910,322 A 10/1975 Hardesty et al.
4,146,754 A 3/1979 Rose
(Continued)

FOREIGN PATENT DOCUMENTS

CA 2 722 912 11/2009
CN 1212304 3/1999
(Continued)

OTHER PUBLICATIONS

Chinese Office Action dated Jun. 27, 2013.
(Continued)

*Primary Examiner* — David M. Gray
*Assistant Examiner* — Geoffrey T Evans
(74) *Attorney, Agent, or Firm* — KED & Associates LLP

(57) ABSTRACT

The present invention relates to a home appliance diagnosis system and to a diagnosis method for same, and more particularly, to a home appliance diagnosis system and to a diagnosis method for same, which involve receiving product information on the home appliance, which is outputted in a predetermined signal form from the home appliance, and analyzing the received product information to check the condition of the home appliance and to diagnose faults in the home appliance. According to the present invention, a diagnosis server easily extracts product information from a signal, and improves the accuracy of the product information through a multi-stage verification process when the diagnosis server outputs product information from the signal received thereat to diagnose the home appliance, to thereby achieve improved accuracy and reliability of the result of the diagnosis based on the product information.

13 Claims, 9 Drawing Sheets

(51) Int. Cl.
*G06F 17/00* (2019.01)
*G06Q 30/00* (2012.01)
*G06Q 50/10* (2012.01)
*H04L 12/28* (2006.01)
*H04M 11/06* (2006.01)

(52) U.S. Cl.
CPC ......... *G06Q 50/10* (2013.01); *H04L 12/2825* (2013.01); *H04M 11/066* (2013.01); *H04L 2012/285* (2013.01)

(56) References Cited

U.S. PATENT DOCUMENTS 4,241,337 A 12/1980 Prada
4,766,505 A 8/1988 Nakano et al.
4,797,656 A 1/1989 Keppler
4,897,659 A 1/1990 Mellon
4,897,857 A 1/1990 Wakatsuki et al.
4,916,439 A 4/1990 Estes et al.
4,977,394 A 12/1990 Manson et al.
5,103,214 A 4/1992 Curran et al.
5,210,784 A 5/1993 Wang et al.
5,268,666 A 12/1993 Michel et al.
5,287,084 A 2/1994 Sone
5,452,344 A 9/1995 Larson
5,506,892 A 4/1996 Kojima et al.
5,586,174 A 12/1996 Bogner et al.
5,664,218 A 9/1997 Kim et al.
5,757,643 A 5/1998 Kuroda et al.
5,774,529 A 6/1998 Johannsen et al.
5,787,724 A 8/1998 Pohl
5,864,828 A 1/1999 Atkins
5,939,992 A 8/1999 Devries et al.
5,940,915 A 8/1999 Nam
5,987,105 A 11/1999 Jenkins et al.
6,121,593 A 9/2000 Mansbery et al.
6,157,313 A 12/2000 Emmermann
6,370,890 B2 4/2002 Roh
6,424,252 B1 7/2002 Adler
6,727,814 B2 4/2004 Saltzstein et al.
6,759,954 B1 7/2004 Myron et al.
6,763,458 B1 7/2004 Watanabe et al.
6,778,868 B2 8/2004 Imamura et al.
6,784,801 B2 8/2004 Watanabe et al.
6,870,480 B2 3/2005 Suzuki et al.
6,873,255 B2 3/2005 Gallagher
6,906,617 B1 6/2005 Van der Meulen
7,010,612 B1 3/2006 Si et al.
7,135,982 B2 11/2006 Lee
7,174,264 B2 2/2007 Yasukawa et al.
7,208,916 B1 4/2007 Boatwright
7,243,174 B2 7/2007 Sheahan et al.
7,266,164 B2 9/2007 Jeon et al.
7,280,643 B2 10/2007 Howard et al.
7,337,457 B2 2/2008 Pack et al.
7,363,031 B1 4/2008 Aisa
7,383,644 B2 6/2008 Lyu et al.
7,439,439 B2 10/2008 Hayes et al.
7,509,824 B2 3/2009 Park et al.
7,558,700 B2 7/2009 Yamashita et al.
7,574,269 B2 8/2009 Cenedese et al.
7,631,063 B1 12/2009 Ho et al.
7,648,476 B2 1/2010 Bock et al.
7,653,512 B2 1/2010 Cheung et al.
7,750,227 B2 7/2010 Hayes et al.
7,843,919 B2 11/2010 Benveniste
7,965,632 B2 6/2011 Sugaya
8,027,752 B2 9/2011 Castaldo et al.
8,040,234 B2 10/2011 Ebrom et al.
8,045,636 B1 10/2011 Lee et al.
8,132,049 B2 3/2012 Yasukawa et al.
8,204,189 B2 6/2012 Rhodes et al.
8,325,054 B2 12/2012 Kim et al.
8,346,508 B2 1/2013 Kim et al.
8,391,255 B2 3/2013 Ribiere et al.
8,428,910 B2 4/2013 Papadimitriou et al.
8,739,057 B2 5/2014 Cheong
2002/0029575 A1 3/2002 Okamoto
2002/0032491 A1 3/2002 Imamura et al.
2002/0078742 A1 6/2002 Kim
2002/0097161 A1 7/2002 Deeds
2002/0116959 A1 8/2002 Ohta et al.
2002/0120728 A1 8/2002 Braatz et al.
2003/0000240 A1 1/2003 Pahl
2003/0028345 A1 2/2003 Watkins et al.
2003/0058101 A1 3/2003 Watanabe et al.
2003/0144010 A1 4/2003 Dollinger
2003/0110363 A1 6/2003 Bachot et al.
2003/0128850 A1 7/2003 Kimura et al.
2003/0167782 A1 9/2003 Roh et al.
2003/0196492 A1 10/2003 Remboski et al.
2004/0032853 A1 2/2004 D'Amico et al.
2004/0132444 A1 7/2004 Herrmann
2004/0158333 A1 8/2004 Ha et al.
2004/0211228 A1 10/2004 Nishio et al.
2004/0249903 A1 12/2004 Ha et al.
2004/0261468 A1 12/2004 Lueckenbach
2005/0015890 A1 1/2005 Kim et al.
2005/0028034 A1 2/2005 Gantman et al.
2005/0029976 A1 2/2005 Terry et al.
2005/0062600 A1 3/2005 Olsen
2005/0086979 A1 4/2005 Son et al.
2005/0129200 A1 6/2005 Forrest et al.
2005/0134472 A1 6/2005 Jang et al.
2005/0162909 A1 7/2005 Wooldridge
2005/0222859 A1 10/2005 Ha
2006/0048405 A1 3/2006 Baek et al.
2006/0066758 A1 3/2006 Higashihara
2006/0089818 A1 4/2006 Norell et al.
2006/0136544 A1 6/2006 Atsmon et al.
2006/0168740 A1 8/2006 Ha et al.
2006/0259199 A1 11/2006 Gjerde et al.
2007/0097622 A1 5/2007 Leech
2007/0113595 A1 5/2007 Harwood et al.
2007/0114293 A1 5/2007 Gugenheim
2007/0137265 A1 6/2007 Shikamori et al.
2007/0175883 A1 8/2007 Miu et al.
2007/0189323 A1 8/2007 Swoboda et al.
2007/0219756 A1 9/2007 Frankel et al.
2007/0254604 A1 11/2007 Kim
2007/0272286 A1 11/2007 Curtius et al.
2008/0007520 A1 1/2008 Lee
2008/0036619 A1 2/2008 Rhodes et al.
2008/0037011 A1 2/2008 Rookie
2008/0072383 A1 3/2008 Bextermoller et al.
2008/0122648 A1 5/2008 Ebrom et al.
2008/0181058 A1 7/2008 Hayakawa
2008/0240396 A1* 10/2008 Faizakov ................ G10L 15/18
379/211.02
2009/0036778 A1 2/2009 Cohen et al.
2009/0067102 A1 3/2009 Cline et al.
2009/0077167 A1 3/2009 Baum
2009/0160637 A1 6/2009 Maeng
2009/0165471 A1 7/2009 Rafalovich
2009/0165475 A1 7/2009 Wasserman
2009/0169434 A1 7/2009 Ogusu
2009/0217682 A1 9/2009 Son
2009/0248245 A1 10/2009 Sumiya
2009/0257354 A1 10/2009 Hannel
2009/0282308 A1 11/2009 Gutsche et al.
2009/0289536 A1 11/2009 Park
2009/0323913 A1 12/2009 Lee et al.
2009/0323914 A1 12/2009 Lee et al.
2010/0023938 A1 1/2010 Lee et al.
2010/0027770 A1 2/2010 Park et al.
2010/0037401 A1 2/2010 Bae et al.
2010/0040213 A1 2/2010 Park et al.
2010/0116060 A1 5/2010 Murayama
2010/0262865 A1 10/2010 Kim
2010/0318324 A1 12/2010 Kim et al.
2011/0018729 A1 1/2011 Kim et al.
2011/0022358 A1 1/2011 Han et al.
2011/0054845 A1 3/2011 Han et al.
2011/0060553 A1 3/2011 Han et al.

(56) References Cited

U.S. PATENT DOCUMENTS

2011/0074589 A1 3/2011 Han et al.
2011/0109471 A1* 5/2011 Park .................. H04W 52/0232 340/870.01
2011/0200189 A1 8/2011 True et al.

FOREIGN PATENT DOCUMENTS

CN 1343862 4/2002
CN 1393672 1/2003
CN 1409886 4/2003
CN 1424843 6/2003
CN 1497915 5/2004
CN 1606282 4/2005
CN 1690685 11/2005
CN 2797999 7/2006
CN 101202639 6/2008
CN 101447119 6/2009
CN 101680693 3/2010
CN 102017519 4/2011
CN 102017520 4/2011
CN 102017593 4/2011
CN 102388572 3/2012
CN 102388574 3/2012
CN 102498691 6/2012
CN 102915004 2/2013
CN 103053136 4/2013
EP 0 038 687 10/1981
EP 0 510 519 10/1992
EP 0 617 557 9/1994
EP 0 691 060 1/1996
EP 0 742 308 11/1996
EP 0 846 991 6/1998
EP 0 851 054 7/1998
EP 0 887 989 12/1998
EP 1 186 694 3/2002
EP 1 186 695 3/2002
EP 2 180 648 4/2010
JP 04-241563 8/1992
JP 04-358497 12/1992
JP 4-358497 12/1992
JP 07-239176 9/1995
JP 10-133767 5/1998
JP 11-127254 5/1999
JP 11-127254 11/1999
JP 2001-345949 12/2001
JP 2001-353395 12/2001
JP 2002-000988 1/2002
JP 2002-011274 1/2002
JP 2002-031471 1/2002
JP 2002-045590 2/2002
JP 2002-85887 3/2002
JP 2002-162149 6/2002
JP 2002-279091 9/2002
JP 2003-172578 6/2003
JP 2004-085071 3/2004
JP 2004-215125 7/2004
JP 2005-061757 3/2005
JP 2005-273943 10/2005
JP 2007-267956 10/2007
JP 2008-003562 1/2008
KR 10-1991-0020404 12/1991
KR 10-1996-0003308 1/1996
KR 10-1997-0019443 4/1997
KR 10-0127232 10/1997
KR 10-0143209 8/1998
KR 10-1999-020285 3/1999
KR 20-1999-0040564 U 12/1999
KR 20-0162050 12/1999
KR 10-2000-0018678 4/2000
KR 10-2001-0036913 5/2001
KR 10-2001-0055394 7/2001
KR 10-2002-0020831 3/2002
KR 10-2002-0030426 4/2002
KR 10-2002-0039959 5/2002
KR 10-2002-0059464 7/2002
KR 10-2003-0000189 1/2003
KR 10-2004-0050767 6/2004
KR 10-2004-0095017 11/2004
KR 10-2004-0103352 12/2004
KR 10-2005-0062747 6/2005
KR 10-2005-0097282 10/2005
KR 10-2006-0056973 5/2006
KR 10-2006-0103014 9/2006
KR 10-0641974 11/2006
KR 10-2007-0013090 1/2007
KR 10-2008-0068447 7/2008
KR 10-0887575 3/2009
KR 10-2009-0115066 11/2009
KR 10-2010-0112950 10/2010
KR 10-2011-0010375 2/2011
KR 10-2011-0010378 2/2011
WO WO 01/11575 2/2001
WO WO 2001/050669 A1 7/2001
WO WO 2005/106096 11/2005
WO WO 2008/010670 1/2008
WO WO 2008/117981 10/2008
WO WO 2009/134090 11/2009
WO WO 2011/087329 7/2011

OTHER PUBLICATIONS

U.S. Office Action issued in U.S. Appl. No. 12/431,893 dated Jul. 30, 2013.
U.S. Office Action issued in U.S. Appl. No. 12/757,339 dated Sep. 6, 2013.
Chinese Office Action dated Dec. 16, 2013.(translation).
European Office Action dated Jan. 7, 2014. (11803799.3).
European Office Action dated Jan. 7, 2014. (11803798.5).
Australian Office Action dated Jan. 13, 2014.
Korean Office Action dated Jan. 28, 2014.
Japanese Office Action dated Feb. 4, 2014.
U.S. Appl. No. 12/757,339, filed Apr. 9, 2010.
U.S. Appl. No. 12/432,184, filed Apr. 29, 2009.
U.S. Appl. No. 13/382,334, filed Jan. 5, 2012.
U.S. Appl. No. 13/808,403, filed Jan. 4, 2013.
U.S. Appl. No. 12/842,649, filed Jul. 23, 2010
U.S. Appl. No. 13/522,066, filed Jul. 13, 2012.
U.S. Appl. No. 13/562,704, filed Jul. 31, 2012.
U.S. Appl. No. 13/588,164, filed Aug. 17, 2012.
U.S. Appl. No. 13/922,669, filed Jun. 20, 2013.
U.S. Appl. No. 13/933,467, filed Jul. 2, 2013.
U.S. Office Action issued in U.S. Appl. No. 12/432,184 dated May 22, 2014.
Korean Office Action dated May 26, 2014.
U.S. Notice of Allowance issued in U.S. Appl. No. 12/757,339 dated May 28, 2014.
U.S. Office Action issued in U.S. Appl. No. 13/382,334 dated Jun. 5, 2014.
U.S. Appl. No. 12/432,111, filed Apr. 29, 2009.
U.S. Appl. No. 12/757,232, filed Apr. 9, 2010.
U.S. Appl. No. 12/846,013, filed Jul. 29, 2010.
U.S. Appl. No. 12/847,272, filed Jul. 30, 2010.
U.S. Appl. No. 12/847,406, filed Jul. 30, 2010.
U.S. Appl. No. 12/847,284, filed Jul. 30, 2010.
U.S. Appl. No. 12/847,306, filed Jul. 30, 2010.
Japanese Office Action dated Oct. 29, 2013.
U.S. Office Action issued in U.S. Appl. No. 12/847,272 dated Dec. 2, 2013.
U.S. Office Action issued in U.S. Appl. No. 12/847,284 dated Dec. 4, 2013.
U.S. Office Action issued in U.S. Appl. No. 12/847,406 dated Dec. 17, 2013.
U.S. Office Action issued in U.S. Appl. No. 12/847,306 dated Dec. 17, 2013.
U.S. Office Action issued in U.S. Appl. No. 13/588,164 dated Apr. 3, 2015.
U.S. Final Office Action issued in U.S. Appl. No. 13/562,704 dated Apr. 9, 2015.

(56) References Cited

OTHER PUBLICATIONS

U.S. Appl. No. 12/850,240, filed Aug. 4, 2010.
U.S. Office Action issued in U.S. Appl. No. 12/757,232 dated Apr. 18, 2013.
U.S. Office Action issued in U.S. Appl. No. 12/846,013 dated May 7, 2013.
U.S. Notice of Allowance issued in U.S. Appl. No. 12/603,810 dated Jun. 12, 2013.
U.S. Office Action issued in U.S. Appl. No. 12/432,111 dated Jun. 13, 2013.
U.S. Office Action issued in U.S. Appl. No. 12/847,272 dated Jun. 27, 2013.
U.S. Office Action issued in U.S. Appl. No. 12/757,213 dated Jun. 28, 2013.
U.S. Office Action issued in U.S. Appl. No. 12/847,284 dated Jun. 28, 2013.
U.S. Office Action issued in U.S. Appl. No. 12/847,406 dated Jul. 9, 2013.
U.S. Office Action issued in U.S. Appl. No. 12/847,306 dated Jul. 9, 2013.
U.S. Appl. No. 12/431,893, filed Apr. 29, 2009.
U.S. Appl. No. 12/431,903, filed Apr. 29, 2009.
U.S. Appl. No. 12/431,910, filed Apr. 29, 2009.
U.S. Appl. No. 12/432,132, filed Apr. 29, 2009.
U.S. Appl. No. 12/551,827, filed Sep. 1, 2009.
U.S. Appl. No. 12/568,022, filed Sep. 28, 2009.
U.S. Appl. No. 12/757,205, filed Apr. 9, 2010.
U.S. Appl. No. 12/757,213, filed Apr. 9, 2010.
U.S. Appl. No. 12/757,246, filed Apr. 9, 2010.
U.S. Appl. No. 12/603,810, filed Oct. 22, 2009.
U.S. Appl. No. 12/842,679, filed Jul. 23, 2010.
U.S. Appl. No. 12/846,040, filed Jul. 29, 2010.
U.S. Appl. No. 12/847,303, filed Jul. 30, 2010.
U.S. Appl. No. 12/840,240, filed Aug. 4, 2010.
Milica Stojanovic; "Recent Advances in High-Speed underwater Acoustic Communications"; IEEE Journal of Oceanice Engineering, IEEE Service Center; Piscataway, NJ; vol. 21, No. 2; Apr. 1, 1996; pp. 125-136 (XP011042321).
Creber, R. K. et al.; "Performance of Undersea Acoustic Networking Using RTS/CTS Handshaking and ARQ Retransmission"; Oceans, 2001 MTS/IEEE Conference and Exhibition; Nov. 5-8, 2001; Piscataway, NJ; IEEE, vol. 4; Nov. 5, 2001; pp. 2083-2086 (XP010566758).
International Search Report dated Dec. 18, 2009 issued in Application No. PCT/KR2009/002288.
International Search Report dated Dec. 21, 2009 issued in Application No. PCT/KR2009/002199.
International Search Report dated Jan. 4, 2010 issued in Application No. PCT/KR2009/002211.
International Search Report dated Aug. 23, 2010 issued in Application No. PCT/KR2010/000319.
International Search Report dated Dec. 1, 2010 issued in Application No. PCT/KR2010/002222.
International Search Report dated Dec. 1, 2010 issued in Application No. PCT/KR2010/002211.
International Search Report dated Apr. 25, 2011 issued in Application No. PCT/KR 2010/004407.
International Search Report dated May 26, 2011 issued in Application No. PCT/KR2010/005108.
International Search Report issued in Application No. PCT/KR2011/000311 dated Jul. 28, 2011.
European Search Report dated Oct. 14, 2011 issued in Application No. 09 73 8950.
United States Office Action dated Dec. 27, 2011 issued in U.S. Appl. No. 12/432,184.
United States Office Action dated Feb. 10, 2012 issued in U.S. Appl. No. 12/568,022.
United States Office Action dated Feb. 14, 2012 issued in U.S. Appl. No. 12/431,910.
United States Office Action dated Mar. 1, 2012 issued in U.S. Appl. No. 12/846,040.
Russian Office Action dated Feb. 7, 2012. (with translation).
U.S. Office Action issued in U.S. Appl. No. 12/431,903 dated Mar. 8, 2012.
U.S. Office Action issued in U.S. Appl. No. 12/431,893 dated Mar. 19, 2012.
U.S. Office Action issued in U.S. Appl. No. 12/432,132 dated Mar. 20, 2012.
U.S. Office Action issued in U.S. Appl. No. 12/757,205 dated Apr. 2, 2012.
U.S. Office Action issued in U.S. Appl. No. 12/432,111 dated May 2, 2012.
European Search Report dated May 8, 2012.
U.S. Office Action issued in U.S. Appl. No. 12/757,246 dated May 18, 2012.
U.S. Office Action issued in U.S. Appl. No. 12/757,339 dated May 22, 2012.
U.S. Notice of Allowance issued in U.S. Appl. No. 12/568,022 dated Jun. 11, 2012.
U.S. Office Action issued in U.S. Appl. No. 12/757,213 dated Jun. 25, 2012.
Russian Office Action issued in Application No. 2010144513/08 dated Jun. 27, 2012.
U.S. Office Action issued in U.S. Appl. No. 12/603,810 dated Jul. 5, 2012.
U.S. Office Action issued in U.S. Appl. No. 12/431,910 dated Jul. 23, 2012.
U.S. Office Action issued in U.S. Appl. No. 12/431,893 dated Jul. 31, 2012.
Notice of Allowance issued in U.S. Appl. No. 12/842,679 dated Aug. 1, 2012.
U.S. Office Action issued in U.S. Appl. No. 12/431,903 dated Aug. 2, 2012.
U.S. Office Action issued in U.S. Appl. No. 12/432,184 dated Aug. 7, 2012.
Korean Office Action dated Aug. 13, 2012.
U.S. Office Action issued in U.S. Appl. No. 12/432,132 dated Aug. 15, 2012.
U.S. Office Action issued in U.S. Appl. No. 12/551,827 dated Aug. 16, 2012.
Notice of Allowance issued in U.S. Appl. No. 12/846,040 dated Aug. 17, 2012.
Japanese Office Action dated Sep. 11, 2012.
Notice of Allowance issued in U.S. Appl. No. 12/757,205 dated Sep. 14, 2012.
U.S. Office Action issued in U.S. Appl. No. 12/847,303 dated Sep. 14, 2012.
U.S. Office Action issued in U.S. Appl. No. 12/757,232 dated Sep. 18, 2012.
U.S. Office Action issued in U.S. Appl. No. 12/432,111 dated Nov. 15, 2012.
Chinese Office Action dated Nov. 16, 2012.
U.S. Office Action issued in U.S. Appl. No. 12/431,910 dated Dec. 5, 2012.
U.S. Office Action issued in U.S. Appl. No. 12/757,213 dated Dec. 13, 2012.
European Search Report dated Dec. 17, 2012.
U.S. Office Action issued in U.S. Appl. No. 12/432,132 dated Dec. 19, 2012.
U.S. Office Action issued in U.S. Appl. No. 12/850,240 dated Dec. 27, 2012.
U.S. Office Action issued in U.S. Appl. No. 12/846,013 dated Dec. 28, 2012.
European Search Report dated Jan. 2, 2013.
U.S. Office Action issued in U.S. Appl. No. 12/431,903 dated Jan. 2, 2013.
U.S. Notice of Allowance issued in U.S. Appl. No. 12/847,303 dated Jan. 11, 2013.
U.S. Office Action issued in U.S. Appl. No. 12/757,246 dated Jan. 17, 2013.
Ethem M Sözer; "Simulation and Rapid Prototyping Environment for Underwater Acoustic Communications: Reconfigurable Modem";

(56) References Cited

OTHER PUBLICATIONS

OCEANS—Europe 2005; MIT Sea Grant College Program; Cambridge, MA, 02139; IEEE; pp. 80-85 (XP10838461A).
U.S. Office Action issued in U.S. Appl. No. 12/431,893 dated Jan. 29, 2013.
U.S. Office Action issued in U.S. Appl. No. 12/757,339 dated Jan. 31, 2013.
European Search Report dated Jan. 31, 2013. (10761908.2).
European Search Report dated Jan. 31, 2013. (10797292.9).
Japanese Office Action dated Feb. 12, 2013. (with translation).
U.S. Office Action issued in U.S. Appl. No. 12/603,810 dated Feb. 13, 2013.
U.S. Office Action issued in U.S. Appl. No. 12/551,827 dated Mar. 11, 2013.
U.S. Office Action issued in U.S. Appl. No. 12/842,649 dated Mar. 22, 2013.
Korean Notice of Allowance dated Aug. 30, 2013.
U.S. Office Action issued in U.S. Appl. No. 12/842,649 dated Oct. 8, 2013.
Chinese Office Action dated Oct. 10, 2013. (416610).
Chinese Office Action dated Oct. 10, 2013. (419110).
U.S. Notice of Allowance issued in U.S. Appl. No. 12/846,013 dated Nov. 5, 2013.
Russian Office Action issued in Application No. 2013130254 dated Jan. 23, 2015.
European Search Report dated Jun. 20, 2016.
U.S. Office Action issued in U.S. Appl. No. 13/808,403 dated Aug. 4, 2016.
U.S. Office Action issued in U.S. Appl. No. 13/588,164 dated Aug. 5, 2016.
U.S. Office Action issued in U.S. Appl. No. 13/522,066 dated Aug. 25, 2016.
European Search Report dated Mar. 23, 2016.
Chinese Office Action dated Oct. 30, 2014.
Japanese Office Action dated Nov. 18, 2014.
Chinese Office Action dated Dec. 3, 2014.
U.S. Notice of Allowance issued in U.S. Appl. No. 13/922,669 dated Dec. 31, 2014.
Australian Office Action dated Sep. 22, 2014.
Chinese Office Action dated Oct. 8, 2014.
U.S. Notice of Allowance issued in U.S. Appl. No. 13/382,334 dated Nov. 12, 2014.
U.S. Office Action issued in U.S. Appl. No. 13/562,704 dated Nov. 19, 2014.
U.S. Notice of Allowance issued in U.S. Appl. No. 12/842,649 dated Dec. 10, 2014.
International Search Report issued in PCT Application No. KR2011/004949 dated Mar. 20, 2012.
Chinese Office Action dated Feb. 3, 2016.
European Search Report dated Feb. 5, 2016.
U.S. Office Action issued in U.S. Appl. No. 13/933,467 dated Feb. 16, 2016.
U.S. Office Action issued in U.S. Appl. No. 13/522,066 dated Mar. 2, 2016.
U.S. Office Action issued in U.S. Appl. No. 13/588,164 dated Mar. 17, 2016.
U.S. Office Action issued in U.S. Appl. No. 13/808,403 dated Apr. 7, 2016.
Korean Office Action dated Feb. 26, 2014.
Korean Office Action dated Feb. 28, 2014.
Chinese Office Action dated Mar. 4, 2014.
Chinese Office Action dated Mar. 5, 2014.
U.S. Office Action issued in U.S. Appl. No. 12/842,649 dated Aug. 15, 2014.

* cited by examiner

[Fig. 1]
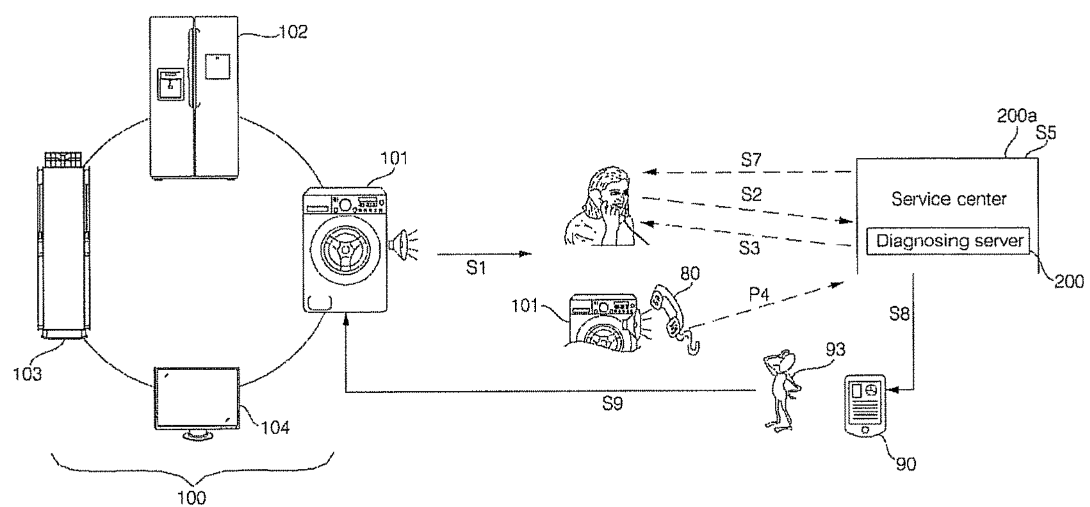

[Fig. 2]
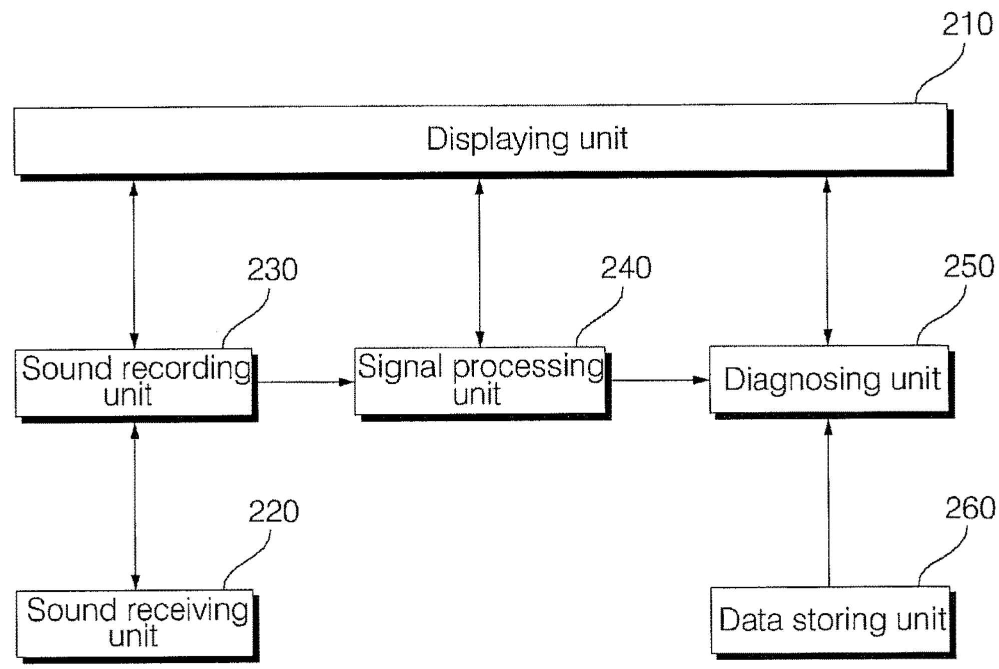
[Fig. 3]
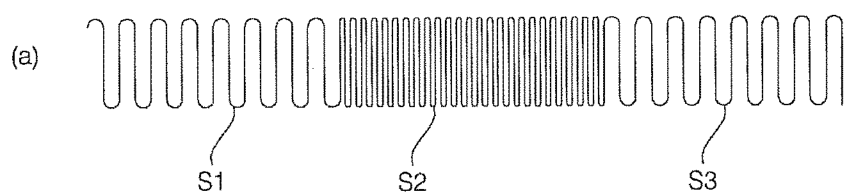
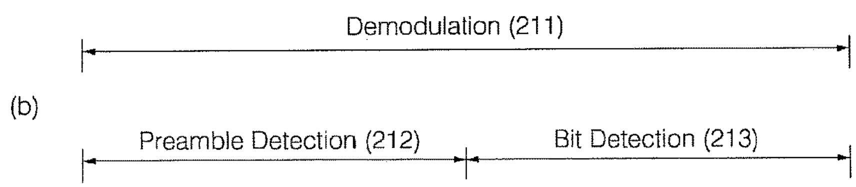

[Fig. 4]
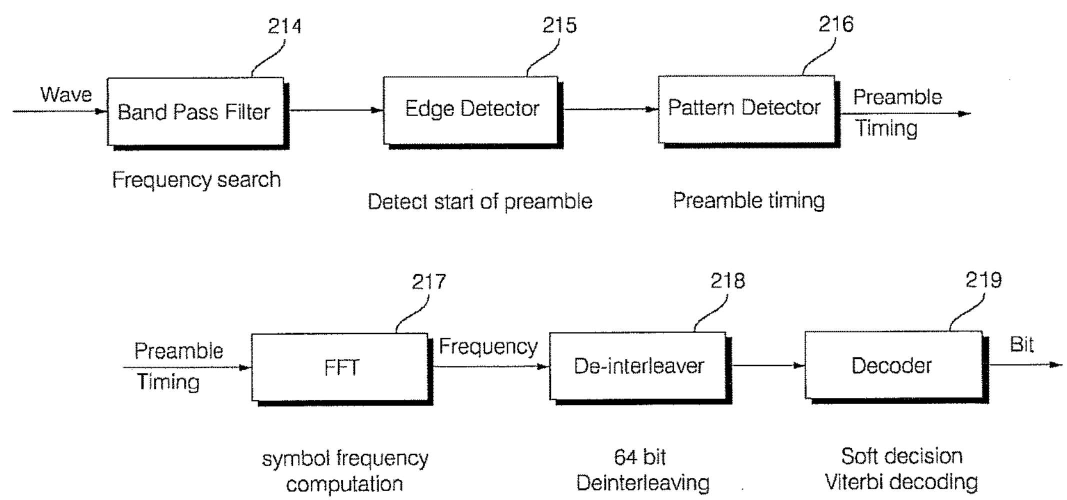

[Fig. 5]
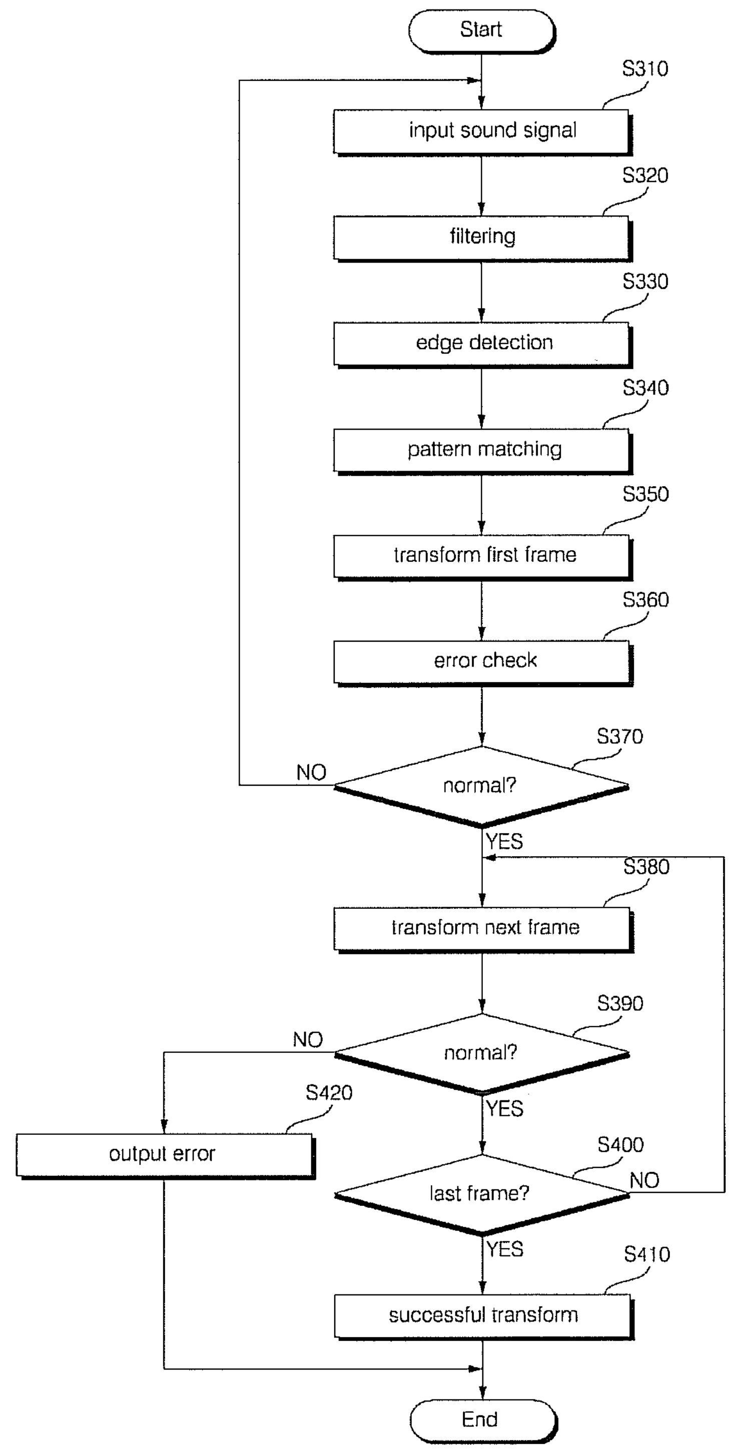

[Fig. 8]
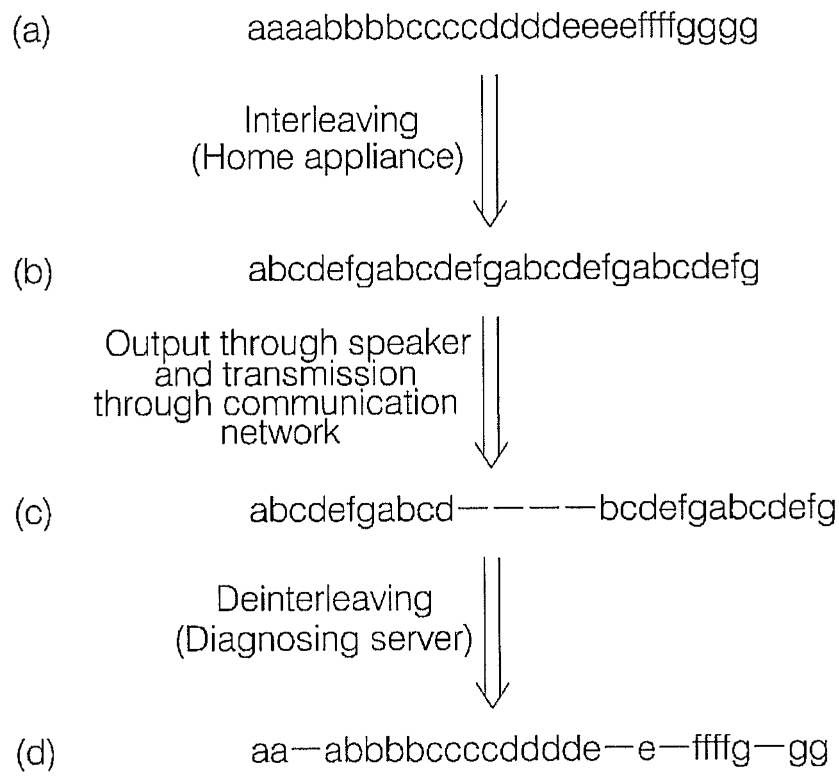

[Fig. 9]
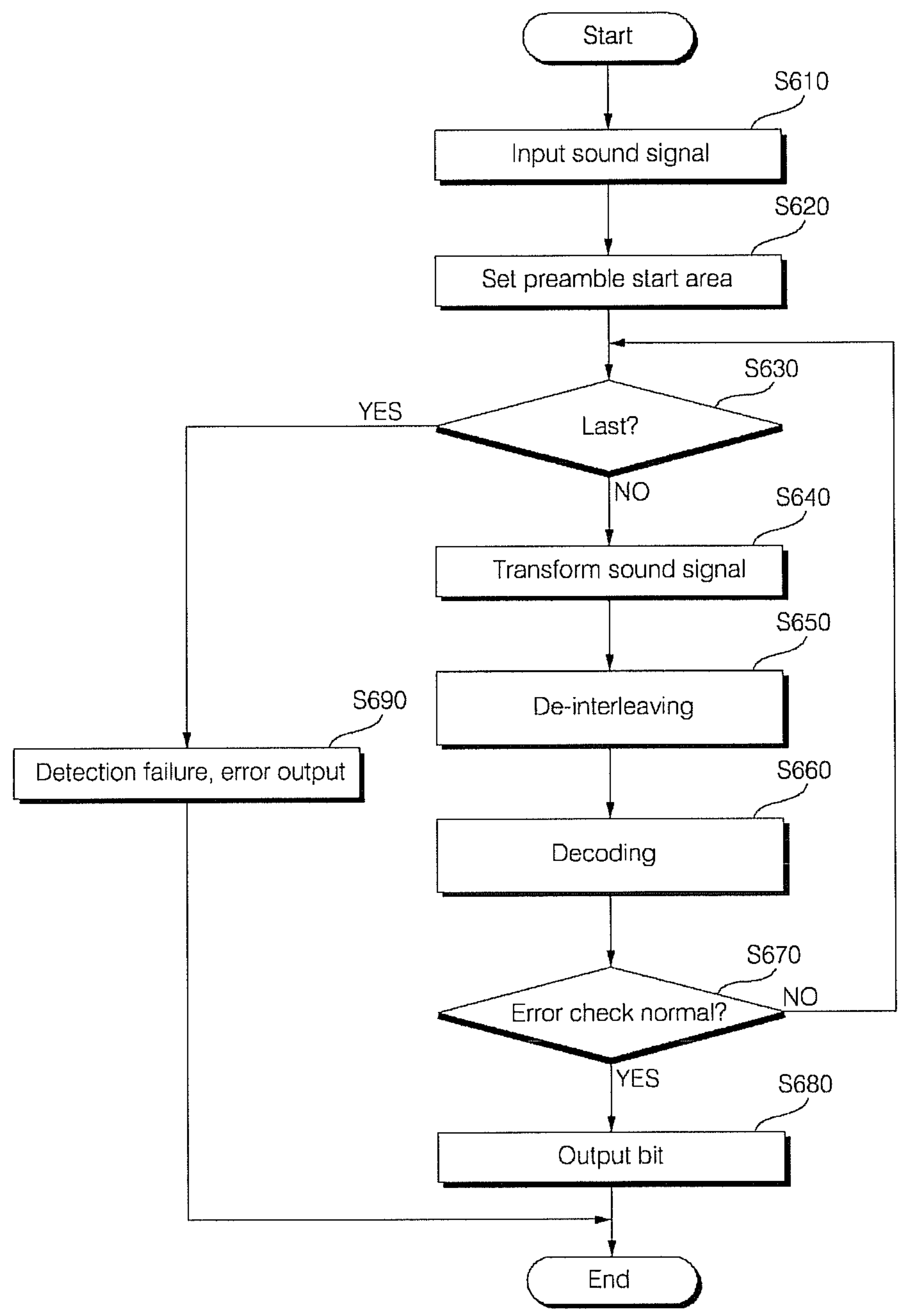

[Fig. 10]
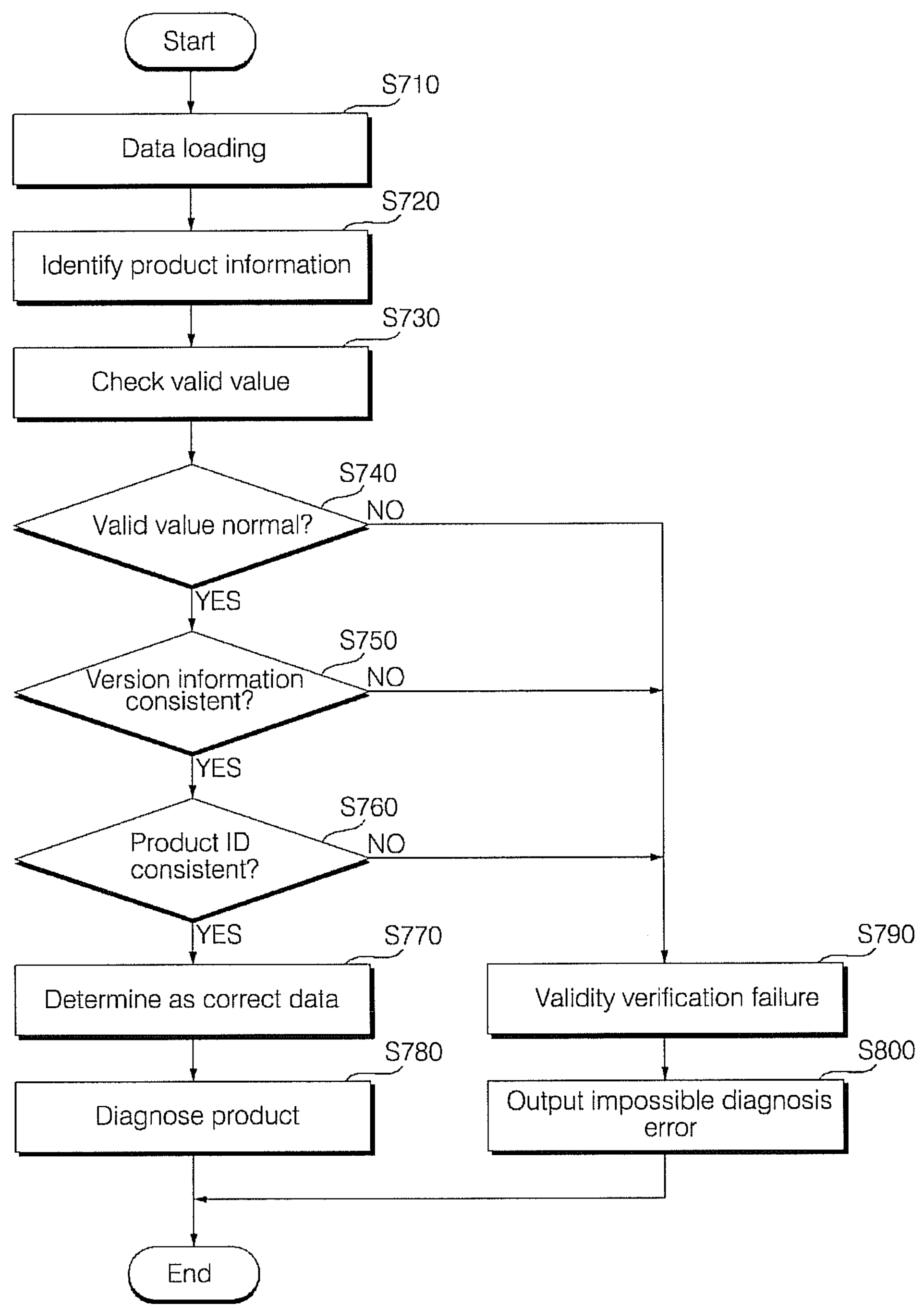

HOME APPLIANCE DIAGNOSIS SYSTEM AND DIAGNOSIS METHOD FOR SAME

TECHNICAL FIELD

The present invention relates to a home appliance diagnosis system and diagnosis method thereof, and more particularly, to a home appliance diagnosis system and diagnosis method that facilitates a customer service by receiving and analyzing product information of a home appliance output from the home appliance in a predetermined signal form to thereby check the state of the home appliance and diagnose a failure of the home appliance.

BACKGROUND ART

A home appliance stores setting values for performing a predetermined operation, information generated during the operation or failure information, and in particular, outputs a predetermined alarm when a failure occurs, so that a user using the home appliance may be recognize the state of the home appliance. Such home appliance does not only indicate the completeness of an operation or occurrence of a failure but also outputs specific failure information through an output means provided therein, such as, e.g., a displaying means or lamp.

Meanwhile, in case an error occurs in the home appliance, a user contacts a service center to ask for some advice or request them to send a service person to fix the home appliance.

At this time, failure information is output from the home appliance in a simple way or as code values that are not understood by the user, and thus, it is difficult for the user to respond to the failure. Accordingly, even when the home appliance may be connected to the service center, the state of the home appliance, in many cases, is difficult to exactly let them know. Thus, a service person who visits the user's home fails to precisely figure out the state of the home appliance in advance, thus leading to an increase in time and costs for fixing the home appliance. For example, unless parts necessary to repair the home appliance are previously prepared, a service person needs to revisit the user's home and consumes time as much.

To address such problems, the home appliance may be connected to a server of the service enter through a predetermined communication means, and this requires establishment of a communication network.

Further, development in technology enables remote diagnosis on failure information using a telephone network.

Patent application No. EP0510519 discloses a technology of transferring failure information from a home appliance to a service center through a telephone network and a model connected to the home appliance. However, the problem is that the model needs to remain connected to the model. In particular, home appliances, such as washing machines, which are generally installed outdoor, are limited by place when being connected to a telephone network.

U.S. Pat. No. 5,987,105 discloses a technology of transforming failure information of a home appliance into a sound with an audible frequency and transmitting it to a service center through a telephone and a telephone network. While the failure information of the home appliance is transformed into the audible-frequency sound and is then transferred to the phone receiver, signal interference may occur due to surrounding environments, or during the course of transmission of the sound through the telephone network, data loss may happen according to characteristics of the telephone network.

In the above-described U.S. Pat. No. 5,987,105 patent, the size of one symbol, which represents one bit as one information unit, is set as 30 ms and an independent frequency is used for each bit in order to prevent data loss and exact product transfer.

However, the conventional systems fail to suggest specific schemes on how to perform diagnosis on the state of the home appliance by receiving a sound. There is a need for offering specific ways on performing failure diagnosis using data included in product information in addition to outputting the product information using a sound.

Further, the conventional systems can diagnose only error codes, but does not provide any solutions when the home appliance itself does not have problems but the operation of the home appliance is affected by surrounding facilities or environments or no errors are found but a user reports inconvenience or failures.

Even for the problems that may be solved by the user's simple manipulation, a service person is sometimes dispatched. Accordingly, a need exists for a scheme to be able to respond to users' complaints.

DISCLOSURE

Technical Problem

An object of the present invention is to provide a home appliance and diagnosis system, in which when product information is output in a tiny signal form from the home appliance, a diagnosing server receives and analyzes the output signal so that the product information is easily extracted from the signal, and a failure of the home appliance is easily diagnosed based on the product information.

Technical Solution

A diagnosing server according to the present invention includes a sound receiving unit that receives, through a predetermined communication network, product information including at least one of an identification information of a home appliance, setting information, operation information, and mal-function information, which is output from the home appliance, a sound recording unit that records a signal received through the sound receiving unit, a signal processing unit that inversely extracts the product information from the signal recorded by the sound recording unit, and a diagnosing unit that analyzes the product information, diagnoses a state or failure of the home appliance, and produces a diagnosis result, wherein the signal processing unit detects a start point of a preamble representing a start of the product information and a frequency of the signal, detects the preamble through pattern matching, performs demodulation and decoding any one of a plurality of frames constituting the product information with respect to the preamble, and detects an error of the preamble.

A diagnosis system according to the present invention includes a home appliance that outputs as a predetermined signal product information including at least one of identification information, setting information, operation information, and mal-function information, a diagnosing server that extracts the product information from the received signal of the home appliance to diagnose the home appliance and produces a diagnosis result on a state or failure of the home appliance, and a terminal that transmits the signal sound to the diagnosing server through a telephone network or a mobile communication network, wherein the diagnosing server detects a start point of a preamble representing a start of the product information and a frequency of the signal, detects the preamble through pattern matching, performs demodulation and decoding any one of a plurality of frames constituting the product information with respect to the preamble, and detects an error of the preamble.

A method of operating a diagnosing server according to the present invention includes the steps of receiving a signal including product information of a home appliance through a predetermined communication network and storing the received signal, detecting a start point of a preamble from the signal and detects the preamble through pattern matching with respect to the start point of the preamble, performing demodulation and decoding on any one of a plurality of frames constituting the product information with respect to the preamble, in a case where the one frame is normal, performing demodulation and decoding on the plurality of frames to finally extract the product information, and analyzing the product information to diagnose the home appliance.

Advantageous Effects

In the home appliance diagnosis system and diagnosis method configured as above according to the present invention, a sound output from the home appliance is received to extract the product information, and the home appliance is diagnosed based on the product information. The product information is easily extracted from the signal, and accuracy of the product information is increased through several stages of a verification process, so that accuracy and reliability on the diagnosis results obtained based on the product information may be increased.

DESCRIPTION OF DRAWINGS

FIG. 1 is a view illustrating a configuration of a home appliance diagnosis system according to an embodiment of the present invention.

FIG. 2 is a view illustrating a configuration of a diagnosing server according to an embodiment of the present invention.

FIG. 3 is a view schematically illustrating a configuration of a step of processing a signal output form a home appliance by the diagnosing server of FIG. 2.

FIG. 4 is a view illustrating a processing step of the signal processing process of FIG. 3.

FIG. 5 is a flowchart illustrating a signal analysis method of a diagnosing server according to an embodiment of the present invention.

FIG. 8 is a view illustrating an example of data processing in a demodulation process of a diagnosing server according to an embodiment of the present invention.

FIG. 9 is a flowchart illustrating a bit determination method of a diagnosing server according to the present invention.

FIG. 10 is a flowchart illustrating a method of determining validity of data according to the present invention.

BEST MODE

Figure 6:
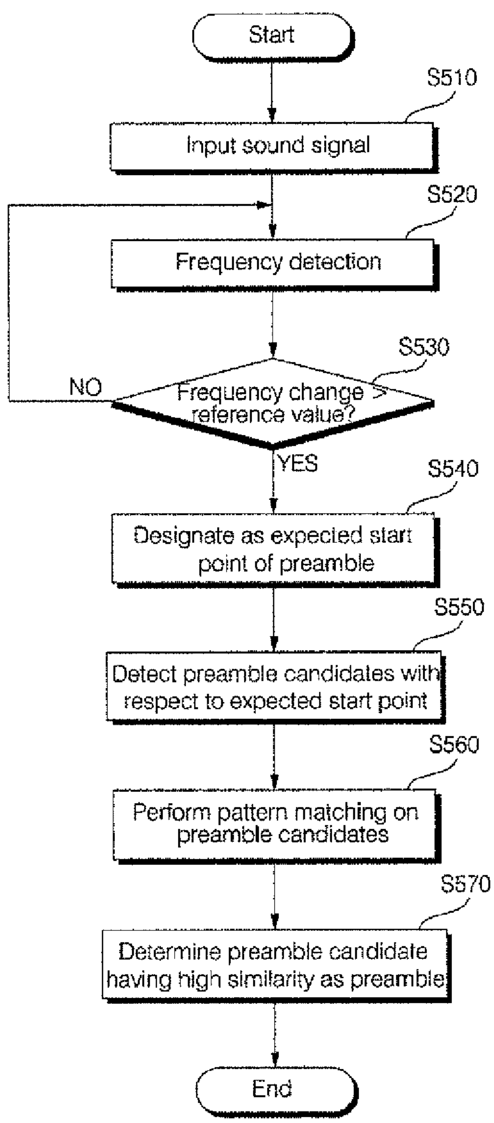
FIG. 6 is a view illustrating a method of detecting a preamble of a diagnosing server according to an embodiment of the present invention.

Hereinafter, embodiments of the present invention will be described with reference to the accompanying drawings. Advantages and features of the present invention and methods for achieving the same may be apparent from the embodiments described in detail in conjunction with the drawings. The present invention is not limited to the disclosed embodiments, but rather may be embodied in various forms. The embodiments are provided merely to make the present invention fully disclosed and to thoroughly let those skilled in the art know the category of the invention, and the present invention is defined only by the claims. The same reference numerals denote the same components throughout the specification.

FIG. 1 is a view illustrating a configuration of a home appliance diagnosis system according to an embodiment of the present invention.

Referring to FIG. 1, the diagnosis system according to an embodiment of the present invention includes at least one home appliance 100 that transforms product information into a signal sound and outputs the signal sound and a diagnosing server 200 that receives a signal output from the home appliance 100 through a communication network, inversely extracts the product information from the signal, and diagnoses the home appliance 100 based on the product information.

At this time, the diagnosing server 200 is a component included in a service center 200*a* and performs a diagnosis on the home appliance 100 based on a signal received corresponding to a failure report or diagnosis request received through the service center 200*a*.

The home appliance 100 is an electrical apparatus provided in a home or firm to offer convenience and is a refrigerator 102, a washing machine 101, an air conditioner 103, or a television 104. The home appliance 100 includes a displaying unit that displays predetermined data, and the displaying unit, as a light emission body, such as an LED, an LCD, or an organic EL, visualizes and displays state information or failure information of the home appliance 100.

Further, the home appliance 100 includes a sound output unit as a means to output a sound and outputs product information, such as the operation, state, or failure of the home appliance 100, as a predetermined sound. In some cases, the home appliance 100 may also transmit a predetermined signal which is not a sound through a communication network.

In case a failure occurs in the home appliance 100 or the home appliance 100 does not normally work due to environmental cause or a user's mal-operation, a predetermined alert sound is output from the home appliance 100 (S1). At this time, the home appliance 100 outputs an error code or alert message through the displaying unit or outputs an alert sound through the sound output unit.

The user recognizes it and takes proper measures, and as necessary, contacts the service center 200*a* to inquire about a measure (S2).

The user explains erroneous symptoms of the home appliance 100 to an operator of the service center 200*a*, and the operator advices him of a corresponding measure (S3).

The user might be attempting to take some measures by manipulating the home appliance 100 following the tip provided by the operator, but such measure may be not enough to address the erroneous symptoms of the home appliance 100. Such situation may come from the fact that the user fails to exactly explain the state of the home appliance 100 to the operator or the erroneous symptoms explained by the user are not sufficient to correctly figure out the cause of malfunction of the home appliance 100.

The user manipulates the home appliance 100 to start a diagnosis mode by bringing a user terminal 80, e.g., a phone, close to the sound output unit following the operator's guide.

The home appliance 100 may include a selecting unit that may allow a user to select stat of a diagnosis mode, and the selecting unit may consist of input means, such as a button, a dial, a tact switch, or a touch pad.

When entering into the diagnosis mode by the user manipulating the selecting unit, the home appliance 100 transforms the product information into a predetermined signal sound and outputs the signal sound. The signal sound is output through the sound output unit as described above and transmitted to the service center 200*a* through a communication network connected to the user terminal 80.

The service center 200*a* includes a diagnosing server 200 that is connected to the communication network and receives the signal sound output from the sound output unit of the home appliance 100 (S4) and analyzes the received sound to thereby perform a diagnosis of the home appliance. The diagnosing server 200 inversely extracts the product information from the signal sound received through the communication network and analyzes the product information to thereby diagnose the home appliance 100 (S5).

A diagnosis result may be transferred to the user as a voice through the operator of the service center 200*a* or transmitted to the user terminal 80 according to what the diagnosis result is (S7).

Further, the diagnosis result may be notified to a repair person 93 to be dispatched to the user's home for fixing the home appliance 100 (S8). The repair person 93 identifies the notified diagnosis result through a terminal 90 and visits the user with necessary parts prepared for repair (S9). Since the necessary parts may be exactly prepared in advance, the repair person 93 may be highly unlikely to revisit the user.

Hereinafter, the home appliance 100 according to the present invention is, as an example, a washing machine, but is not limited thereto, and the present invention may also be applicable to all types of home appliance 100, including an electric rice cooker or microwave, as well as the above-listed TV, air conditioner, or refrigerator. At this time, the communication network is, as an example, a telephone network or mobile communication network, and the user terminal 80 is, as an example, a telephone or a mobile terminal.

FIG. 2 is a view illustrating a configuration of a diagnosing server according to an embodiment of the present invention. Referring to FIG. 2, the diagnosing server 200 includes a displaying unit 210, a sound receiving unit 220, a sound recording unit 230, a signal processing unit 240, a diagnosing unit 250, a data storing unit 260, and a server controller (not shown) that controls the overall operation of the diagnosing server.

The displaying unit 210 displays various information including a diagnosis progressing state and/or diagnosis result of the home appliance 1 in such a way as being able to recognized by an operator of the service center 200*a*.

The sound receiving unit 220 receives a signal sound through a communication network. As described above in connection with FIG. 1, the signal sound including the product information output from the home appliance 100 is transmitted through a telephone and a communication network connected to the telephone to the sound receiving unit 220.

An operator of the service center informs the user of smart diagnosis as described above, and then, manipulates the input means of an input unit so that the signal sound received through the user terminal 80 is input to the diagnosing server through the sound receiving unit 220.

The sound recording unit 230 records the signal sound received through the sound receiving unit 220. The sound recording unit 230 may record the signal sound received through the sound receiving unit 220 in a wave file format. At this time, the diagnosing server 200 may include a recording medium, such as a RAM, a hard disk, or a NAND flash memory, to record the signal sound file.

The signal processing unit 240 inversely extracts the product information from the signal sound recorded by the sound recording unit 230. The signal processing unit 240 demodulates and decodes the wave file configuring the sound signal, thereby extracting the product information.

At this time, the signal processing unit 240 transforms recorded analog signal sound data into bit stream data, stores the bit stream data, detects a preamble, and extracts the product information of the home appliance 100 based on the preamble. During the course, the signal processing unit 240 extracts the product information by demodulating the recorded data and decoding the demodulated data.

The signal transform performed in the signal processing unit 230 is an inverse conversion of the signal transform performed in the home appliance 100, and each home appliance 100 and the diagnosing server 240 preferably transform data through the same signal transform system based on a mutual agreement. Here, the signal processing unit 240 may perform decoding using a Viterbi decoding algorithm corresponding to an encoding scheme of the home appliance 100.

The signal processing unit 230 transforms a predetermined frequency band of an analog signal sound through an inverse transform using any one of frequency shift keying, amplitude shift keying, and phase shift keying.

Further, if the signal sound is recorded in the sound recording unit 230, the signal processing unit 240 detects an error occurring while the signal sound is received through the communication network or an error occurring during the course of recording, thereby determining whether it is a normal signal.

At this time, the signal processing unit 240 determines whether the signal sound has been normally recorded or the recorded signal sound stays normal by analyzing the recorded data. The signal processing unit 240 performs a predetermined correction process for error correction when an error is detected, but in some cases, despite performing such correction process, it may be difficult to restore it to normal data.

In case the recorded signal sound is not a normal signal, the signal processing unit 240 outputs, through the displaying unit 210, that signal sound recording is not complete, so as to request the signal sound to be output again from the home appliance 100. At this time, an operator of the service center may identify what is output from the displaying unit 210 and may request the user of the home appliance 100 to re-output the signal sound through the user terminal 80.

In case the recorded signal sound is a normal signal, the signal processing unit 240 completes the recording and displays, through the displaying unit 210, what says that recording has been normally done.

The diagnosing unit 250 analyzes the product information extracted from the signal processing unit 240 and performs a diagnosis on the home appliance 100 based on the product information. The diagnosing unit 250 performs a diagnosis in association with the data storing unit 260.

Further, the diagnosing unit 250 reflects the diagnosis result using study data of a database 300. At this time, the diagnosing unit 250 may produce a diagnosis result using the study data during the course of diagnosis using data stored in the data storing unit 260, and in some cases, performs a first diagnosis based on the data stored in the data storing unit 260 and then may perform a final diagnosis using the study data.

Upon performing diagnosis on the home appliance, the diagnosing unit 250 first determines whether study data is stored, and if there is applicable study data, applies this to thereby produce a diagnosis result.

The diagnosis result produced by the diagnosing unit 250 is stored in the data storing unit 260.

In the case of applying the study data, the diagnosing unit 250 may include the probability of occurrence or measure data for possibility of each of a plurality of causes and solutions included in the diagnosis result. For example, a diagnosis result for a water supply error comes up together with the probability of occurrence for each of a plurality of causes, such as a user's mistake in manipulation to cause a water supply error, a problem with supply of tab water, a trouble in connection of a water supply hose, an error of a water supply filter or a water level sensor.

The study data is obtained by integrating data for results of repair, errors between the diagnosis result and actual state based on the results produced by the repair person 93 himself checking and repairing the home appliance on the basis of the diagnosis results for a failure diagnosis.

The diagnosis result is produced based on the study data depending on the highest probability of cause of the water supply error and the degree of error.

The data storing unit 260 stores diagnosis logics and diagnosed data items.

A data structure stored in the data storing unit 260 may include a table storing at least one diagnosis logic (hereinafter, referred to as 'diagnosis logic table') and a table storing at least one diagnosis data item (hereinafter, referred to as 'diagnosis data table'). The diagnosis logic table and the diagnosis data table may be separately managed for each type depending on what is subject to diagnosis.

For example, the diagnosing server 200 stores in the diagnosis logic table washing machine diagnosis logics for diagnosing the washing machine and refrigerator diagnosis logics for diagnosing the refrigerator separately from the washing machine diagnosis logic, and stores in the diagnosis data table data items necessary for diagnosing the washing machine and data items necessary for diagnosing the refrigerator.

A signal sound output from the home appliance 100 may include product identification information. The type of a target for diagnosis may be identified through the product information extracted through the signal processing unit 240, and accordingly, the diagnosing unit 250 may call corresponding diagnosis logics and data items necessary for diagnosis depending on the type of the home appliance from the data storing unit 260 to thereby perform a diagnosis.

The diagnosis result includes a failure system, a probability-based failure cause list, and a list of failed parts, and guide information on whether to dispatch service personnel.

The server controller controls data transmission/reception through a communication unit (not shown), enables a signal sound to be received through the sound receiving unit 220 in response to a service center operator's manipulation, and enables an interface and diagnosis result for failure diagnosis to be displayed on the displaying unit 210.

Further, the server controller performs control so that the diagnosis result of the diagnosing unit 250 is transmitted to the terminal 90 of the repair person 93 visiting home and checking and repairing or is transmitted to the user terminal 80.

FIG. 3 is a view schematically illustrating a configuration of a step of processing a signal output form a home appliance by the diagnosing server of FIG. 2.

As shown in FIG. 3*a*, a signal output from the home appliance 100 is received and stored in the diagnosing server. The diagnosing server performs demodulation 211 on a signal from the home appliance, which consists of at least two types of frequency signals, as shown in FIG. 3*b* to thereby extract the product information of the home appliance. The demodulation 211 of the diagnosing server may be divided into preamble detection 212 and bit detection 213.

The signal processing unit 240 of the diagnosing server detects a preamble from the received signal from the home appliance and performs bit detection to thereby perform demodulation on the signal, so that the product information of the home appliance may be extracted from the signal.

The extracted product information is used to diagnose the state or failure of the home appliance by the diagnosing unit 250.

At this time, the demodulation 211 of the signal processing unit 240 is inverse transform of a modulation scheme used to output the signal from the home appliance, and its scheme may be changed depending on the modulation scheme performed in the home appliance.

Here, the home appliance 100 includes version information and information for identifying the home appliance in the stored product information of the home appliance, packetizes the product information, and generates a signal consisting of a plurality of frames. During this course, an encoding unit (not shown) of the home appliance 100 uses an FCS (Frame Check Sequence) to identify an error on a per-frame basis.

The encoding unit of the home appliance configures each frame with a header and a payload. The encoding unit performs FEC encoding on the frame to restore a bit error, follows convolution coding and puncturing scheme and performs interleaving. Since the signal may be damaged by background noise or interference while being transmitted through a communication network, the frame is encoded in the above-described way and is thereby changed to an FEC code so as to address such problems.

The encoding unit encodes the header and the payload at different code rates, respectively. For example, if the header is coded based on ½ code rate and is subjected to interleaving, the payload is coded based on ⅔ code rate and is followed by interleaving. Further, the extended length is reduced by puncturing using a puncturing matrix, and bit interleaving is performed on a per-32 bits basis after coding in order to respond to a burst error that occurs during transmission. Further, the encoding unit adds a preamble to the encoded header and payload and puts an IFS (Inter Frame Space) between a frame and another frame.

The preamble represents that one frame begins and may be formed in various patterns. For example, the preamble may have a pattern of 0x0FF0. The IFS is a section between two frames, where no signal is output.

The signal processing unit 240 of the diagnosing server undergoes the above-described signal processing to thereby inversely transform a signal output from the home appliance to extract product information. During the course, the preamble inserted in the frame is detected as described above, so that the position where data of the product information starts is found, thereby extracting the product information.

FIG. 4 is a view illustrating a processing step of the signal processing process of FIG. 3.

The preamble detection and bit detection of the demodulation performed in the signal processing unit 240 are described in further detail. Hereinafter, an example is described where a home appliance outputs product information as a predetermined sound and the signal sound is input to a diagnosing server through a telephone network.

Referring to FIG. 4, in the preamble detection step 212, the signal processing unit 240 filters a received signal sound (wave) using a band pass filter (214).

The signal processing unit 240 removes noise added during the course of transmission by filtering the frequency used to output a sound in the home appliance through the band pass filter. At this time, the band pass filter is used to figure out a carrier frequency, and this is to find the start point of the preamble rapidly and correctly. At this time, the diagnosing server previously stores information on the frequency used for outputting a sound from the home appliance.

The signal processing unit 240 detects the start point of the preamble using from the filtered signal using an edge detector 215. The edge detector 215 may extract a position of the filtered signal, where the frequency is sharply changed, thereby determining the start point of the preamble. At this time, if signals of carrier frequencies, e.g., 2.6 kHz and 2.8 kHz, appear to minimize any confusion due to remaining noise, the frequency is drastically raised, and thus, such position is detected.

A pattern detector 216 detects the preamble with the start point of the preamble extracted by the edge detector 215. Since the preamble uses a constant pattern or a designated value, whether there is a preamble is identified through pattern detection.

At this time, the position of the preamble extracted by the edge detector may be mistakenly recognized as the preamble due to noise, and thus, among a plurality of candidates associated with the start point of the preamble, a position having the most similarity found through detection of each pattern is designated as the position of the preamble. As such, the position of the preamble may be exactly detected by detecting the pattern of the preamble with respect to the plurality of candidates.

If the preamble is detected through the above-described process, the signal processing unit 240 starts bit detection.

Here, although having detected the position of the preamble, the signal processing unit 240 may not avoid an error that occurs during signal transmission, and thus, designates the start point of the data with respect to the signal sound and sets a predetermined margin. The signal processing unit 240 sets a preamble start range by putting a predetermined margin before and after the start point.

As the margin increases, the range of the data start point increases. Accordingly, demodulation is done on lots of start points, and thus, accuracy is increased. However, speed is decreased. Therefore, it is preferable to set a margin as large as accuracy and speed both may be satisfied.

The signal processing unit 240 calculates frequency components through FFT so as to modulate the signal sound that is sound data (217). The signal processing unit 240 figures out the frequency of a symbol through frequency component calculation. If the frequency and the magnitude of the frequency are produced through the FFT, the frequency of symbol is computed based on the produced frequency and the magnitude.

This is to compute whether the frequency represented by the symbol is bit 1 or 0, and is done to exactly produce bits corresponding to signal deformations that occur due to signal loss, distortion, or noise, during the transmission of the signal sound.

Here, with respect to the product information, information on the bits is transformed into a predetermined frequency signal, and one frequency signal may be here represented as one symbol.

For symbol frequency computation, of a computation using an average value, a method of calculating an RMS average, and a computation of obtaining an average using the square of the magnitude to make the magnitudes of frequencies further apart from each other, one may be used.

In the case of using an average value, the symbol frequency is computed according to the following Equation 1. At this time, M is a magnitude.

$$f_{avg} = \frac{\underset{i}{Q} f_i M_i}{\underset{i}{Q} M_i} \quad \text{[Equation 1]}$$

In the case of using an RMS average, the following Equation 2 is used to compute the symbol frequency:

$$f_R = \sqrt{\frac{\underset{i}{Q} f^2 M_i}{\underset{i}{Q} M_i}} \quad \text{[Equation 2]}$$

Meanwhile, in the case of using the square of the magnitude, the following Equation 3 may be used for symbol frequency computation:

$$f_{mavg} = \sqrt{\frac{\underset{i}{Q} f^2 M_i^2}{\underset{i}{Q} M_i^2}} \quad \text{[Equation 3]}$$

Determination on the signal follows Equation 4. At this time, f is a symbol frequency computed before.

$$\text{Signal} = -\frac{f - \left(\frac{f_1 + f_0}{2}\right)}{\frac{f_1 - f_0}{2}} \quad \text{[Equation 4]}$$

As each symbol is closer to −1 through frequency computation, it is determined as 1, and as it is closer to 1, it is determined as 0.

If bits are determined through per-symbol frequency computation, the signal processing unit 240 performs de-interleaving through a de-interleaver 218.

This is to restore a signal interleaved in the home appliance through the de-interleaver 218. At this time, 64-bit interleaving may be carried out. Through this, despite signal distortions or losses that occur during the course of transmission, signal restoration may be achieved.

If de-interleaving is complete, the signal is decoded by a decoder 219 and the product information is thus extracted.

FIG. 5 is a flowchart illustrating a signal analysis method of a diagnosing server according to an embodiment of the present invention.

Referring to FIG. 5, the diagnosing server receives a signal sound that is a sound signal through a communication network if product information of a home appliance is output as a predetermined sound.

If the sound signal is input (S310), the sound receiving unit 220 of the diagnosing server applies it to the sound recording unit 230 which then stores the signal sound that is a sound signal.

The signal processing unit 240 detects a preamble from the stored signal sound by filtering, edge detection, and pattern matching (S320 to S340) and performs decoding on one frame based on the detected preamble, thereby transforming data (S350).

Error check is done on the transformed frame (S360) to thereby determine whether a result of the error check is normal or not (S370). At this time, if the error check result shows 'abnormal', the signal processing unit 240 goes back to the preamble detection on the input signal sound to repeatedly perform the transform on the frame.

In case error check result shows 'normal', the next frame is subjected to transform (S380).

Whether the transformed frame is normal by performing an error check on the transformed fame is determined (S390), and in case it is normal, frame transform is performed up to the last frame (S380, S400).

If the transform is normally complete up to the last frame (S410), the diagnosing unit 250 diagnoses the state of the home appliance and whether there is a failure in the home appliance based on the extracted product information.

Meanwhile, in case an error occurs in the transformed frame, the error is output (S420). At this time, the error that occurs during the frame transform is output through the displaying unit 210. In some cases, the preamble detection and its subsequent processes may be re-performed, or a message requesting that the signal be re-output to the home appliance may be generated and displayed.

FIG. 6 is a view illustrating a method of detecting a preamble of a diagnosing server according to an embodiment of the present invention.

Referring to FIG. 6, if a signal sound that is a sound signal is input through the sound receiving unit 220 (S510), the signal is filtered as described above. At this time, a carrier frequency is detected through filtering using a band pass filter 214 (S520).

From the filtered signal, a position where frequency is sharply changed is detected by the edge detector 215. At this time, a position where the carrier frequency appears may be detected, and whether a change in the frequency is larger than a reference value is determined (S530), thereby detecting a start point of the preamble.

If the frequency change is smaller than the reference value, it is determined as a temporary signal change due to noise or so, and other positions are newly detected over its subsequent signals (S520 to S530). If the frequency change is larger than the reference value, it is determined as a carrier frequency appearing, and the corresponding position is designated as an expected start point of the preamble (S540).

Preamble candidates are detected through edge detection with respect to the expected start point of the preamble (S550). At this time, there may be a plurality of expected start points of the preamble, or there may be a plurality of preamble candidates.

The signal processing unit determines whether the preamble candidates are the preamble through pattern matching (S560). Since the preamble consists of a designated pattern or designated data, among the plurality of preamble candidates, the one having the most similarity is determined as the preamble through pattern matching (S570). At this time, the start point of the preamble is determined based on the determined preamble.

If the preamble is determined by performing pattern matching on all of the plurality of preamble candidates with respect to a plurality of expected start points, the signal processing unit initiates bit detection.

Figure 7:
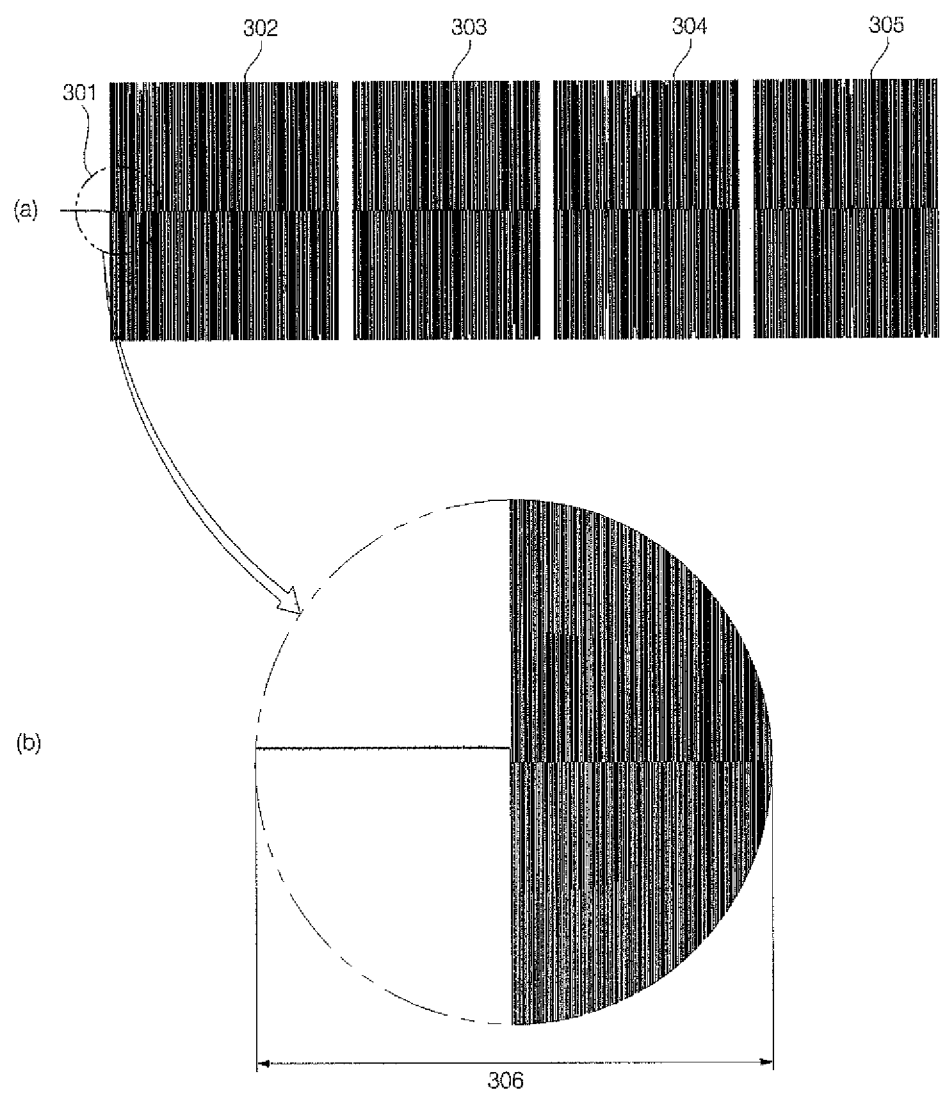
FIG. 7 is a view illustrating an example of setting a start area of a preamble depending on bit determination of a diagnosing server according to the present invention.

FIG. 7 is a view illustrating an example of setting a start area of a preamble depending on bit determination of a diagnosing server according to the present invention.

As described earlier, if the preamble is determined, and the start point of the preamble is then determined, the signal processing unit 240 performs decoding. Before the decoding, even when the preamble has been correctly detected, an error might be occurring during the signal transmission process, and thus, the preamble start area is set, with a predetermined margin put from the start point of the preamble.

Since the preamble represents the start point of data, if an error occurs in the preamble, subsequently transformed data may also have an error. Accordingly, a predetermined margin may be put before and after the start point 301 of the preamble, thereby increasing accuracy of the preamble.

In case an input signal consists of four frames, first to fourth frames 302 through 305, as shown in FIG. 7*a*, if the preamble is detected with respect to the first frame, a preamble start area is set on the preamble detected at the first frame.

As shown in FIG. 7*b*, the preamble start area 306 is set.

At this time, as the margin set in the preamble start area increases, the area where transform and error check are performed also increases, so that accuracy may be enhanced whereas processing speed is decreased.

FIG. 8 is a view illustrating an example of data processing in a demodulation process of a diagnosing server according to an embodiment of the present invention.

Referring to FIG. 8, the home appliance 100 interleaves data, modulates a signal, and outputs it. This is to prepare for a signal loss that may occur due to signal leakage and noise according to characteristics of a signal transmission process communication network.

The diagnosing server 200 receives the interleaved and output signal through a communication network, de-interleaves and decodes the received signal, and receives data, thereby performing a diagnosis on the home appliance.

For example, if, as shown in FIG. 8*a*, data 'aaaabbbbccccddddeeeeffffgggg' goes through bit interleaving in the order of 0th, 4th, 8th, 12th, 16th, and 20th data and 1rd, 5th, 9th, 13th, 17th, and 21th data, the order of data is changed to 'abcdefgabcdefgabcdefgabcdefg' as shown in FIG. 8*b*. If the interleaved data is transformed and transmitted through a predetermined communication network, the diagnosing server 200 receives the data.

At this time, even though the received signal has some losses as shown in FIG. 8*c* and thus turns into 'abcdefgabcd_bcdefgabcdefg', it becomes 'aa_abbbcccdddde_eef_ffg_gg' through de-interleaving as shown in FIG. 8*d*, and thus, restoration may be possible by using neighboring bits.

FIG. 9 is a flowchart illustrating a bit determination method of a diagnosing server according to the present invention.

Referring to FIG. 9, as described above, if a sound signal is input (S610), and a preamble is detected from the signal sound, a preamble start area is set with a predetermined size of a margin put with respect to the start point of the preamble (S620).

With the foremost position of the set preamble start area designated as the start point of the preamble, signal transform (S640) is carried out on one fame through FFT, and de-interleaving and decoding are performed (S660). Thusly transformed frame goes through error check to thereby determine whether it is normal or not (S670).

In case the result of the error check performed on the signal-transformed frame shows abnormal, it is shifted by a predetermined interval in the preamble start area, and the preamble start point is thereby reset. With respect to the newly set preamble start point, signal transform (S640) is performed on the frame through FFT, and de-interleaving and decoding are conducted (S660).

At this time, the above process is repeated with the preamble start point being shifted at about 1 ms interval in the preamble start area.

Further, upon decoding, convolution decoding is performed. This is to probabilistically decode the transmitted convolution-encoded data according a Viterbi algorithm so that the data is restored as meaningful data. The error included in the transmission channel is restored during de-interleaving and decoding processes.

In case the error check result shows normal, bits for the corresponding frame are output (S680). Then, transform for the next frame is initiated, and demodulation up to the last frame is complete. If demodulation is complete on all of the frames, the diagnosing unit 250 diagnoses the state of the home appliance.

Meanwhile, in case the error check result shows abnormal for all of the frames in the preamble start area, it is determined as a detection failure and accordingly an error is output on the displaying unit 210 (S690). In some cases, a request of signal re-output may be sent to the home appliance.

Such processes are repeated, and in case the frame is normal, the corresponding preamble and start point of the preamble are determined as normal.

In the preamble detection process described above, despite preamble selection through pattern matching, there may be an error, and thus, the preamble start area is set as described above, and the above-described transform process is repeated while the start point of the preamble is changed in the area, so that the preamble may be exactly detected and thus product information may be correctly extracted.

FIG. 10 is a flowchart illustrating a method of determining validity of data according to the present invention.

Even in case the product information is extracted by performing verification on the position of the preamble in several stages as described above, the signal processing unit determines validity of the product information.

The product information extracted from the transformed data is loaded (S710), and the model of the product is identified from the product information (S720). For example, whether the home appliance is a washing machine or refrigerator is determined, and if the home appliance is a washing machine, the model thereof, e.g., whether it is of a top load type or drum type, is identified.

Even though the demodulation is normally complete, there may be still data losses during the signal transmission, and diagnosis on the home appliance may be varied depending on the product and its related data variables. Accordingly, accuracy of the information is determined.

At this time, as valid values for determining accuracy of the product, version information and product ID are used. First, the version information and product ID are normally included in the product information (S730).

In case the version information and product ID are not included in the product information, it is determined as a detection failure (S790) and an error is output according to impossible diagnosis (S800).

If designated version information and product ID are normally present, it is determined if the version information matches a designated value (S750).

If the version information is normal, it is determined whether the product ID is consistent. According to the product type, designated IDs are compared and if consistent with each other, the extracted product information is determined as normal (S770), and diagnosis on the home appliance is started (S780).

Meanwhile, in case either the version information or product IF is inconsistent, it is determined as a failure to validity verification (S790) and an error is output depending on the impossible diagnosis (S800).

The invention claimed is:

1. A diagnosing server, comprising:

a displaying unit that displays information including a diagnosis progressing state or diagnosis result;

a data storing unit that stores diagnosis data for diagnosis and the diagnosis result;

a sound receiving unit that receives a signal, through a predetermined communication network, including product information including at least one of an identification information of a home appliance, setting information, operation information, or mal-function information, which is output from the home appliance;

a sound recording unit that records the signal received through the sound receiving unit;

a signal processing unit that inversely extracts the product information from the signal recorded by the sound recording unit; and a diagnosing unit that analyzes the product information, diagnoses a state or failure of the home appliance, and produces a diagnosis result, wherein the signal processing unit detects a start point of a preamble representing a start of the product information and a frequency of the signal, detects the preamble through pattern matching, performs demodulation and decoding on any one of a plurality of frames constituting the product information with respect to the preamble, and detects an error of the preamble, wherein the signal processing unit compensates for an error occurring during a transmission process by setting a predetermined section before and after a position of the preamble as a preamble start area, and wherein the diagnosing server transmits the diagnosis result to a user terminal and/or a repair person terminal.

2. The diagnosing server of claim 1, wherein the signal processing unit includes:

a filter that detects a carrier frequency by filtering the signal;

an edge detector that senses a position where the filtered signal value is changed and detects a position of the preamble; and a pattern detector that detects the preamble through preamble pattern matching based on the position of the preamble.

3. The diagnosing server of claim 2, wherein the signal processing unit detects the preamble according to the position of the preamble detected by the edge detector, and then, in a case where the detected preamble has an error, newly filters the sound signal to re-detect a position of the preamble, and then re-detects the preamble.

4. The diagnosing server of claim 3, wherein the signal processing unit performs an error check on the product information extracted based on the preamble, and then, in a case where when an error occurs in the product information, the preamble has an error, re-detects the preamble.

5. The diagnosing server of claim 2, wherein the edge detector detects a position where a frequency of the signal is changed by a predetermined value or more within a short time with respect to signals before and after the position of the carrier frequency.

6. The diagnosing server of claim 1, further comprising:

an input unit that allows the sound recording unit to input a command according to start and stop of recording of the signal sound received through the sound receiving unit and a diagnosis execution command; and a communication unit that transmits the diagnosis result.

7. The diagnosing server of claim 1, wherein the signal processing unit performs an error check on the one frame, and upon detection of an error, determines there is an error in the preamble, re-detects a preamble from the sound signal, and then re-extracts the product information, and in a case where an error check result shows that the preamble is normal, performs demodulation and decoding on the plurality of frames to thereby extract the product information.

8. The diagnosing server of claim 7, wherein the signal processing unit includes:

an FFT that detects a symbol frequency based on the preamble;

a de-interleaver that performs de-interleaving based on the symbol frequency; and a decoder that decodes the de-interleaved signal.

9. The diagnosing server of claim 1, wherein the signal processing unit repeatedly performs demodulation while shifting the preamble start point by a predetermined time interval in the preamble start area with respect to one frame.

10. The diagnosing server of claim 9, wherein the signal processing unit performs demodulation on the plurality of frames by designating as normal data a demodulation result that causes no error among a plurality of demodulation results for the preamble start area.

11. The diagnosing server of claim 10, wherein in a case where errors occur in all of the plurality of demodulation results for the preamble start area, the signal processing unit determines that the preamble has an error, re-detects the preamble, and performs the demodulation.

12. The diagnosing server of claim 1, wherein the signal processing unit tests validity for the product information by using version information and a product ID with respect to the extracted product information.

13. A diagnosis system, comprising:

a home appliance that outputs as a signal sound, product information including at least one of identification information, setting information, operation information, or mal-function information;

a diagnosing server that extracts the product information from a received signal of the home appliance to diagnose the home appliance and produces a diagnosis result on a state or failure of the home appliance; and a user terminal that transmits the signal sound to the diagnosing server through a telephone network or a mobile communication network, wherein the diagnosing server detects a start point of a preamble representing a start of the product information and a frequency of the signal, detects the preamble through pattern matching, performs demodulation and decoding on any one of a plurality of frames constituting the product information with respect to the preamble, and detects an error of the preamble, wherein the diagnosing server comprises a signal processor that inversely extracts the product information from the signal recorded by a sound recorder, and wherein the signal processor compensates for an error occurring during a transmission process by setting a predetermined section before and after a position of the preamble as a preamble start area, and wherein the diagnosing server transmits the diagnosis result to the user terminal and/or a repair person terminal.

* * * * *